(12) United States Patent
Kamon et al.

(10) Patent No.: US 12,441,000 B2
(45) Date of Patent: Oct. 14, 2025

(54) ROBOT SYSTEM AND ROBOT WORKING METHOD

(71) Applicant: KAWASAKI JUKOGYO KABUSHIKI KAISHA, Hyogo (JP)

(72) Inventors: Masayuki Kamon, Kobe (JP); Hitoshi Hasunuma, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 232 days.

(21) Appl. No.: 18/269,060

(22) PCT Filed: Dec. 21, 2021

(86) PCT No.: PCT/JP2021/047362
§ 371 (c)(1),
(2) Date: Jun. 22, 2023

(87) PCT Pub. No.: WO2022/138653
PCT Pub. Date: Jun. 30, 2022

(65) Prior Publication Data
US 2024/0042620 A1    Feb. 8, 2024

(30) Foreign Application Priority Data

Dec. 24, 2020    (JP) ................. 2020-215815

(51) Int. Cl.
*B25J 13/00*    (2006.01)
*B25J 5/00*    (2006.01)
(Continued)

(52) U.S. Cl.
CPC ............. *B25J 13/006* (2013.01); *B25J 5/007* (2013.01); *B25J 9/1676* (2013.01); *B25J 13/06* (2013.01)

(58) Field of Classification Search
None
See application file for complete search history.

(56) References Cited

U.S. PATENT DOCUMENTS

2008/0009969 A1    1/2008  Bruemmer et al.
2015/0190925 A1    7/2015  Hoffman et al.
(Continued)

FOREIGN PATENT DOCUMENTS

CN    110430976 A  * 11/2019  .............. B25J 21/00
CN    111918791 A  * 11/2020  .............. B25J 19/02
(Continued)

OTHER PUBLICATIONS

English translation of CN-111918791-A and its figures (wherein the paragraph numbering provided coincides with any relevant citations to this reference within the accompanying Office Action) (Year: 2020).*

(Continued)

*Primary Examiner* — Jason Holloway
*Assistant Examiner* — Bryant Tang
(74) *Attorney, Agent, or Firm* — Greenblum & Bernstein, P.L.C.

(57) ABSTRACT

A robot system includes a plurality of self-propelled robots, each including an autonomously travelable carriage and a robotic arm mounted on the carriage, and a single manipulation console that is operated by an operator to allow the operator to manually operate the plurality of self-propelled robots. The plurality of self-propelled robots include a first self-propelled robot that performs a given first work, and a second self-propelled robot that performs a given second work different in kind from the first work.

7 Claims, 5 Drawing Sheets

(51) Int. Cl.
*B25J 9/16* (2006.01)
*B25J 13/06* (2006.01)

(56) References Cited

U.S. PATENT DOCUMENTS

2019/0339693 A1    11/2019  Menon et al.
2020/0016742 A1*   1/2020   Ishikawa et al. ...... B25J 19/023

FOREIGN PATENT DOCUMENTS

| CN | 115669249 A * | 1/2023 | ............ B25J 9/0096 |
| JP | 2007-190659 | 8/2007 | |
| JP | 2009-90420 | 4/2009 | |
| JP | 2018-83246 | 5/2018 | |
| WO | WO-2011056633 A1 * | 5/2011 | ............ B25J 9/1666 |

OTHER PUBLICATIONS

English translation of CN-110430976-A (wherein the paragraph numbering provided coincides with any relevant citations to this reference within the accompanying Office Action) (Year: 2019).*
English translation of CN-115669249-A (wherein the paragraph numbering provided coincides with any relevant citations to this reference within the accompanying Office Action) (Year: 2023).*
Lunghi, Giacomo et al., "Multimodal Human-Robot Interface for Accessible Remote Robotic Interventions in Hazardous. Environments," IEEE Access, vol. 7 (Sep. 4, 2019) pp. 127290-127319.

* cited by examiner

ROBOT SYSTEM AND ROBOT WORKING METHOD

CROSS-REFERENCE TO RELATED APPLICATIONS

This application is a National Stage of International Application No. PCT/JP2021/047362 filed Dec. 21, 2021, which claims priority to Japanese Patent Application No. 2020-215815 filed Dec. 24, 2020. The content of each of the above-identified applications is incorporated herein by reference in its entirety.

TECHNICAL FIELD

The present disclosure relates to a robot system and a robot working method.

BACKGROUND ART

Conventionally, a work which is performed by a person (hereinafter, referred to as a "human work") is performed by a robot (hereinafter, referred to as "robotization"). In recent years, the human works are robotized in various fields of industry.

For example, Patent Document 1 discloses a picking system which picks many items by a robot in a logistics center.

REFERENCE DOCUMENT(S) OF CONVENTIONAL ART

Patent Document

[Patent Document 1] JP2018-083246A

DESCRIPTION OF THE DISCLOSURE

Problem(s) to be Solved by the Disclosure

Currently, as we look over all industries, the robotization of the human work has not progressed so much. In order to move the robotization of the human work forward in all industries, it is necessary that the robotization can be conducted efficiently and the robot used can deal with a wide variety of works.

In the picking system disclosed in Patent Document 1, the robot used can perform only a single kind of work, such as picking, and therefore, it cannot be applicable to a wide variety of works.

The present disclosure is made in view of solving the above problem, and one purpose thereof is to provide a robot system and a robot working method, which are capable of contributing to efficient robotization and in which a robot used is applicable to a wide variety of works.

SUMMARY OF THE DISCLOSURE

In order to achieve the purpose described above, a robot system according to one aspect of the present disclosure includes a plurality of self-propelled robots, each including an autonomously travelable carriage and a robotic arm mounted on the carriage, and a single manipulation console that is operated by an operator to allow the operator to manually operate the plurality of self-propelled robots. The plurality of self-propelled robots include a first self-propelled robot that performs a given first work, and a second self-propelled robot that performs a given second work different in kind from the first work. Here, the "kind of work" does not mean the "work" itself, but it means a classification of the work as the work is generally called or classified as "bla bla bla work." Note that the end of the work name or the classification name does not need to be " . . . work," as long as it is substantially the work. Examples of the "kind of work" are picking (item extracting work), operation of a cash register (transaction work), a product display work, a book display work, a medical assist work, a nursing work, a reception work, a guidance work, a guard work, and a cleaning work, for example.

Further, a robot working method according to another aspect of the present disclosure is a robot working method using a plurality of self-propelled robots, each including an autonomously travelable carriage and a robotic am mounted on the carriage, and includes making a first self-propelled robot among the plurality of self-propelled robots perform a given first work, and making a second self-propelled robot among the plurality of self-propelled robots perform a given second work different in kind from the first work, and by an operator operating a single manipulation console, manually operating the first self-propelled robot or the second self-propelled robot selectively.

Effect of the Disclosure

The present disclosure provides the robot system and the robot working method, which are capable of contributing to efficient robotization and in which a robot used is applicable to a wide variety of works.

MODES FOR CARRYING OUT THE DISCLOSURE

Hereinafter, concrete embodiments of the present disclosure are described with reference to the drawings. Note that, below, the same reference characters are assigned to the same or corresponding elements throughout the drawings to omit redundant explanations. Further, since the following drawings are for explaining the present disclosure, elements unrelated to the present disclosure may be omitted, the dimension may not be exact because of an exaggeration etc., the elements may be simplified, and the modes of mutually-corresponding elements may not match with each other in a plurality of drawings. Moreover, the present disclosure is not limited to the following embodiments.

Embodiment 1

Figure 1:
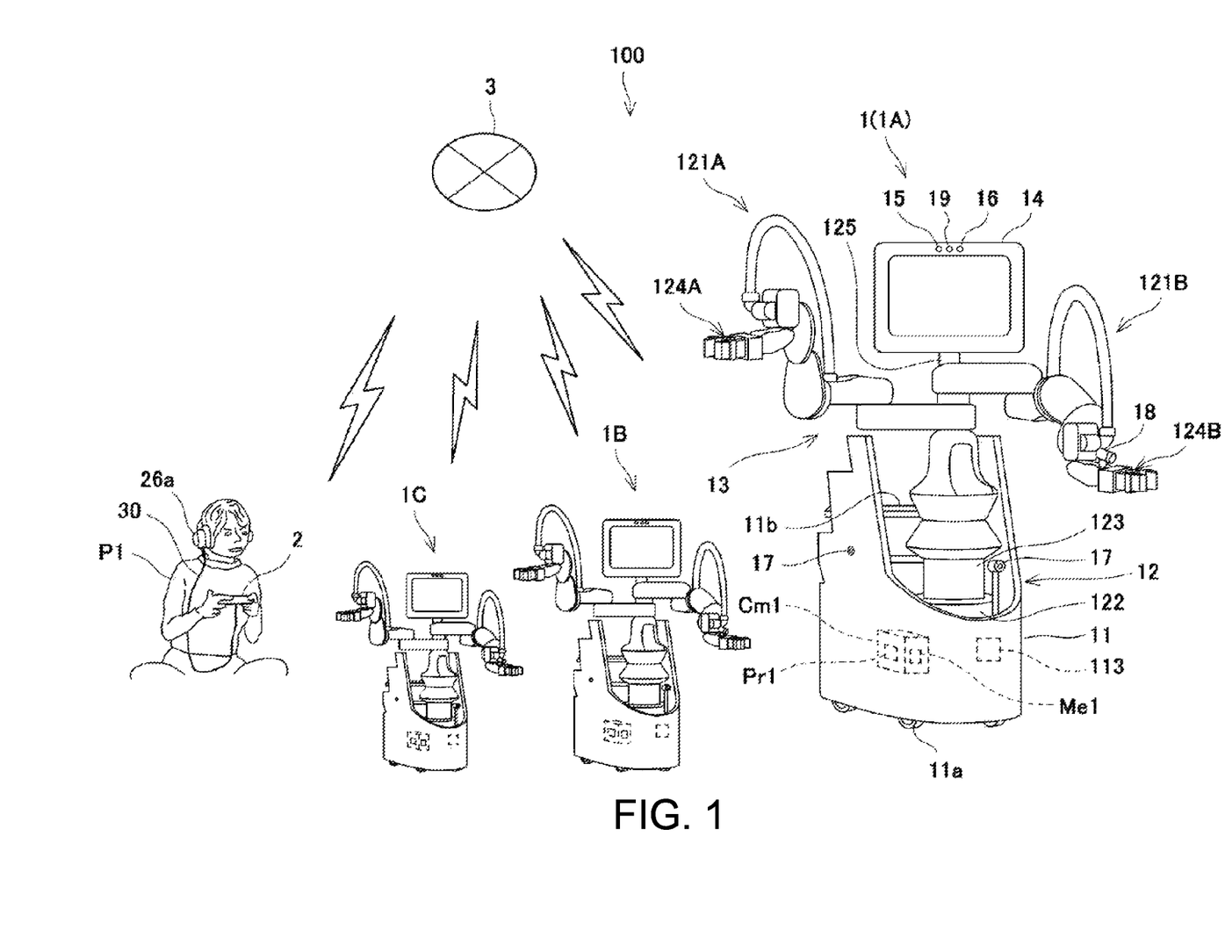
FIG. 1 is a schematic view illustrating one example of a configuration of a robot system according to Embodiment 1 of the present disclosure.
Figure 2:
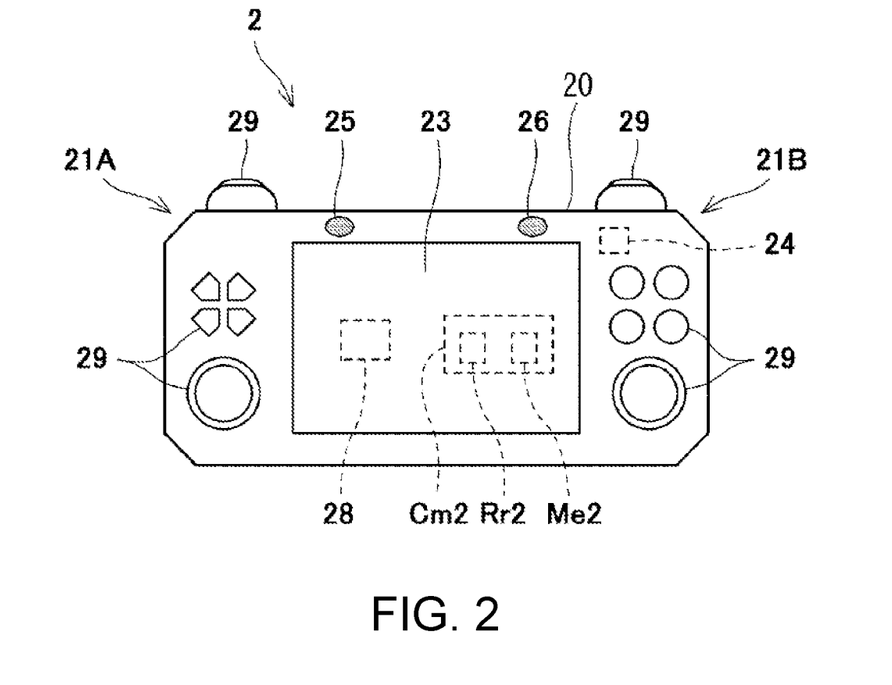
FIG. 2 is a plan view illustrating one example of a configuration of a manipulator of FIG. 1.
Figure 3:
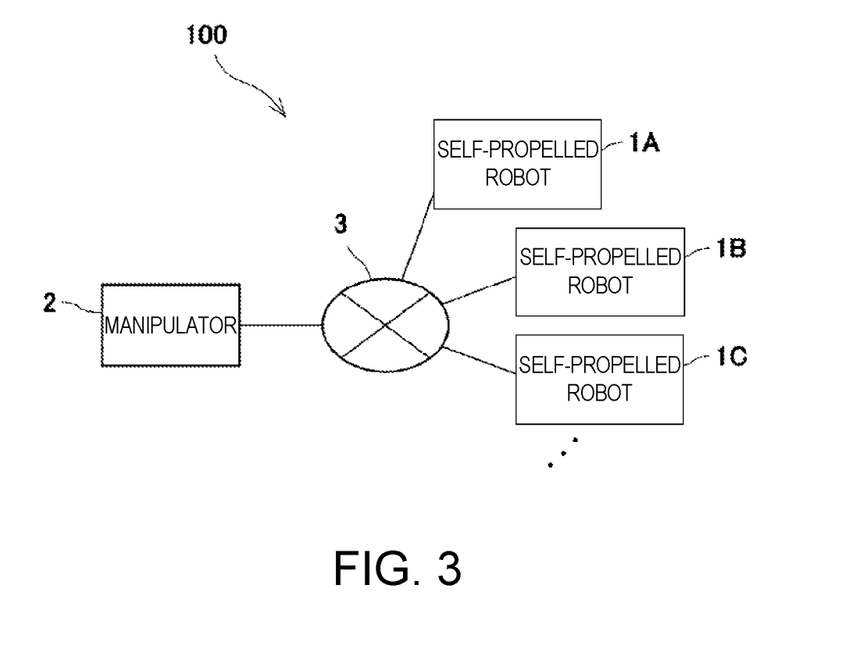
FIG. 3 is a schematic view illustrating an outline of a configuration of a control system of the robot system of FIG. 1.

FIG. 1 is a schematic view illustrating one example of a configuration of a robot system 100 according to Embodiment 1 of the present disclosure. FIG. 2 is a plan view illustrating one example of a configuration of a manipulator 2 of FIG. 1. FIG. 3 is a schematic view illustrating an outline of a configuration of a control system of the robot system 100 of FIG. 1.

[Hardware Configuration]

Referring to FIGS. 1 and 3, the robot system of Embodiment 1 includes a plurality of self-propelled robots 1 (1A, 1B, 1C . . . ) and one manipulator (manipulation console) 2. The plurality of self-propelled robots 1 (1A, 1B, 1C . . . ) and the one manipulator 2 are connected with each other, for example, via a data communication network 3. The self-propelled robots 1 (1A, 1B, 1C . . . ) and the one manipulator 2 may be directly connected wiredly or wirelessly. When specifying each of the plurality of self-propelled robots, a reference character (1A, 1B, 1C . . . ) is assigned, and when specifying the plurality of self-propelled robots comprehensively, or when specifying a representative self-propelled robot, a reference character 1 is assigned to this self-propelled robot.

Below, these elements in the robot system 100 will be described in detail.

<Data Communication Network 3>

The data communication network 3 may be any network as long as it enables data communications. Examples of the data communication network 3 are the Internet, a LAN (Local Area Network), a WAN (Wide Area Network), etc.

<Self-Propelled Robot 1>

Referring to FIG. 1, the self-propelled robot 1 may fundamentally be any configuration as long as it includes a carriage 11 which is autonomously travelable, and an arm (robotic arm) 13 mounted on the carriage 11. In addition to this fundamental configuration, the self-propelled robot 1 is capable of performing a given work. "Capable of performing a given work" means both of a case where the hardware of the self-propelled robot 1 is capable of performing a given work, and a case where the self-propelled robot 1 is programmed to perform a given work. Therefore, even if two self-propelled robots 1 have mutually the same appearance, they may be capable of performing mutually different kinds of works.

Further, being capable of performing "a given work" includes a case of being capable of performing a plurality of "given works." Therefore, each self-propelled robot 1 may be specialized in performing a single work among a plurality of different kinds of works, or may be generalized so that it can perform a plurality of works among the plurality of different kinds of works.

Here, the "kind of work" does not mean the "work" itself, but it means a classification of the work as the work is generally called or classified as "bla bla bla work." Note that the end of the work name or the classification name does not need to be " . . . work," as long as it is substantially the work. Examples of such classified works are picking (item extracting work), operation of a cash register (transaction work), a product display work, a book display work, a medical assist work, a nursing work, a reception work, a guidance work, a guard work, and a cleaning work, for example.

Below, a case where the self-propelled robots 1 are comprised of a first self-propelled robot 1A and a second self-propelled robot 1B, and the first self-propelled robot 1A and the second self-propelled robot 1B are both capable of performing the "operation of a cash register" and "product display work" in a convenience store.

Referring to FIG. 1, the self-propelled robot 1 includes a traveler 11, a hoist (elevator) 12, and the arm 13.

The traveler 11 is comprised of a carriage, for example (hereinafter, referred to be as "the carriage 11"). The carriage 11 is provided at its base part with wheels 11a comprised of front wheels and rear wheels. One of the front wheels and the rear wheels are steering wheels, and at least one of the front wheels and the rear wheels are driving wheels. The hoist 12 is provided to a front part of the carriage, and a shelf 11b where article(s) is placed is provided to a rear part of the carriage 11.

Further, the carriage 11 includes a battery and a motor, and the carriage 11 autonomously travels by the motor driving the wheels 11a while using the battery as a power supply. The hoist 12 and the arm 13, and a robot-side display (robot-side monitor) 14, a robot-side microphone 15, and a robot-side sound emitter (robot-side speaker) 16, which will be described later, operate using this battery as a power supply.

The hoist 12 includes a base 122, and a hoist shaft 123 which ascends and descends with respect to the base 122.

A first robotic arm 121A and a second robotic arm 121B are provided to an upper part of the hoist shaft 123 rotatably on the center axis of the hoist shaft 123. The second robotic arm 121B is provided above the first robotic-arm 121A. Since the first robotic arm 121A and the second robotic arm 121B can interchange respective rotational positions, there is no left arm or right arm.

The first robotic arm 121A and the second robotic arm 121B are articulated robotic arms, and are provided with a hand 124A and a hand 124B at tip ends, respectively.

Although the hand 124A and the hand 124B are not limited in particular, each has a shape which can grip an object.

Circumference cameras 17 are provided at a mid-height of the hoist shaft 123. In addition to those illustrated in the figure, non-illustrated circumference cameras 17 are also provided to a side part and a rear part of the carriage 11. The non-illustrated circumference cameras are provided at the same height as the illustrated circumference cameras 17. The four circumference cameras are devices for an operator P1 to observe the environment (a scenery and a field of view) around the self-propelled robot 1.

A hand camera 18 is provided to a tip-end part of the second robotic arm 121B. The hand camera 18 is a device for the operator P1 to observe an object to be gripped by the pair of hands 124A and 124B.

The robot-side display 14 is attached to an upper end part of the hoist shaft 123 via a support member 125. The robot-side display 14 is comprised of a liquid crystal display, for example.

The robot-side microphone 15, the robot-side sound emitter 16, and a main camera 19 are provided at suitable locations of the robot-side display 14.

The robot-side display 14, the robot-side microphone 15, the robot-side sound emitter 16, and the main camera 19 constitute a device group for the self-propelled robot 1 to have a conversation with a person (hereinafter, referred to as a "conversation partner"). The robot-side display 14 displays information (image information, text information, etc.) to be communicated to the conversation partner. The robot-side microphone 15 acquires voice of the conversation partner. The robot-side sound emitter 16 is comprised of a loudspeaker, and emits the voice information to be communicated to the conversation partner, for example. The main camera 19 images the conversation partner.

The carriage 11 further includes an arithmetic circuit module Cm1 and a robot-side communicator (robot-side transmitter) 113. The arithmetic circuit module Cm1 includes a processor Pr1 and a memory Me1. The arithmetic circuit module Cm1 constitutes a request detector (request detecting circuitry) 111 and a robot controller 112 (see FIG. 4), as will be described later.

<Manipulator 2>

The manipulator 2 is capable of manipulating a plurality of self-propelled robots 1 by at least one of manual operation and automatic operation.

FIG. 2 is the plan view illustrating one example of the configuration of the manipulator 2 of FIG. 1. The manipulator 2 is not limited in particular, as long as it is capable of manipulating the self-propelled robot(s) 1. As illustrated in FIG. 2, the manipulator 2 may be configured so that left and right manipulating parts 21A and 21B are integrated, or may be comprised of a plurality of manipulating parts which are formed individually. The manipulating part is not limited in particular, as long as it is operable by an operator. Examples of the manipulating part are a key, a joystick, a handle, etc.

Alternatively, as illustrated in FIG. 2, the manipulator 2 may be configured so that the manipulating parts 21A and 21B, a manipulation-side display (manipulation-side monitor) 23, a manipulation-side microphone 25, and a manipulation-side sound emitter (manipulation-side speaker) 26 are integrated, or the manipulating parts 21A and 21B, the manipulation-side display 23, the manipulation-side microphone 25, and the manipulation-side sound emitter 26 may be formed separately.

Referring to FIG. 2, the manipulator 2 is provided with a main body 20. The main body 20 is formed in a thin rectangular parallelepiped box.

The left manipulating part 21A and the right manipulating part 21B are provided to a left end part and a right end part of the main body 20, respectively. The left manipulating part 21A and the right manipulating part 21B constitute a manual operation part 21. In each of the left manipulating part 21A and the right manipulating part 21B, a group of given operation keys 29 are disposed. This group of given operation keys 29 is configured similarly to a well-known operation key group of a game machine, for example. Therefore, explanation of this group of given operation keys 29 is omitted. When the operator P1 operates the operation keys 29 suitably with both hands, the self-propelled robot 1 operates according to the operation.

The manipulation-side display 23 is provided to a center part of an upper surface of the main body 20. The manipulation-side display 23 is comprised of a touchscreen, for example. The manipulation-side display 23 displays information (image information, text information, etc.) required for the operator P1 to manipulate the self-propelled robot 1. For example, an image captured by the circumference camera 17, an image captured by the main camera 19, and an image captured by the hand camera 18 are suitably displayed on the manipulation-side display 23.

The manipulation-side microphone 25 and the manipulation-side sound emitter 26 are provided to suitable locations of the upper surface of the main body 20. The manipulation-side microphone 25 acquires voice of the conversation partner. The manipulation-side sound emitter 26 is a loudspeaker, and emits the voice of the conversation partner acquired by the robot-side microphone 15, for example. The manipulation-side sound emitter 26 may be a wearable speaker 26a, such as a headset. A voice output terminal (not illustrated) is provided to a suitable location of the main body 20, and when connecting a connection cord 30 of the wearable speaker 26a to the voice output terminal, an outputting part of the manipulation-side sound emitter 26 is switched from the loudspeaker to the wearable speaker 26a so that the voice of the conversation partner acquired by the robot-side microphone 15 is emitted from the wearable speaker 26a.

Further, a request presenter (informer) 24 is provided at a suitable location of the main body 20. The request presenter 24 presents the operator P1 a manual operation request detected by the request detector 111 of the self-propelled robot 1. The request presenter 24 may be any device as long as it is capable of informing the operator P1 that the manual operation request has arrived. Examples of such a device are a device which stimulates the body of the operator P1, a device which transmits auditory information to the operator P1, a device which transmits visual information to the operator P1, etc. One example of the device which stimulates the body of the operator P1 is a vibrator. The device which transmits the auditory information to the operator P1 may emit voice from the manipulation-side sound emitter 26, such as "a manual operation request has arrived," for example. The device which transmits the visual information to the operator P1 may display a text message on the manipulation-side display 23, such as "a manual operation request has arrived," for example.

Here, the request presenter 24 is comprised of the vibrator, and when the manual operation request arrives, the vibrator vibrates for a given period of time. The operator P1 gets to know that the manual operation request arrived when he/she felt the vibration.

An arithmetic circuit module Cm2 and a manipulation-side communicator 28 are provided inside the main body 20. The arithmetic circuit module Cm2 includes a processor Pr2 and a memory Me2. The arithmetic circuit module Cm2 constitutes an automatic operation part (automatic operation circuitry) 22 and an operation controller 27 (see FIG. 4), as will be described later.

[Configuration of Control System]

Figure 4:
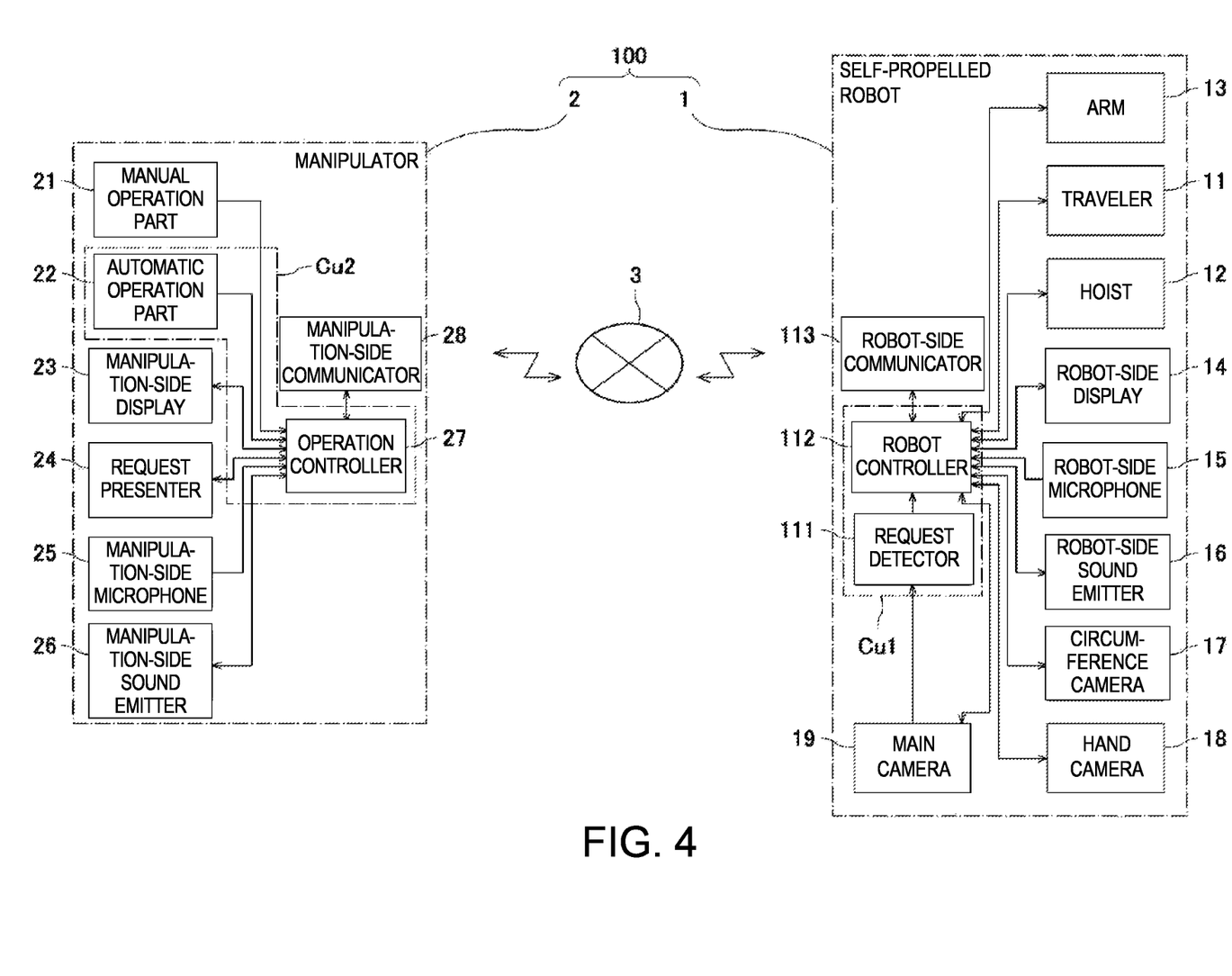
FIG. 4 is a functional block illustrating details of the configuration of the control system of the robot system of FIG. 3.

FIG. 4 is a functional block illustrating details of the configuration of the control system of the robot system 100 of FIG. 3.

Referring to FIG. 4, the robot system 100 includes the self-propelled robot 1 and the manipulator 2.

Below, the configuration of the control system is described dividedly as a configuration about one self-propelled robot, and a configuration about a plurality of self-propelled robots.

<Configuration of One Self-Propelled Robot>

{Configuration on Manipulator 2 Side}

The manipulator 2 includes the manual operation part 21, the automatic operation part 22, the manipulation-side display 23, the request presenter 24, the manipulation-side microphone 25, the manipulation-side sound emitter 26, the operation controller (switch) 27, and the manipulation-side communicator 28.

The manual operation part 21 outputs to the operation controller 27 a key operation signal according to operation of the operation keys 29 by the operator P1.

The automatic operation part 22 stores an automatic operation program set beforehand, and outputs an automatic operation signal to the operation controller 27 according to the automatic operation program.

The manipulation-side display 23 displays an image according to an image display signal inputted from the operation controller 27.

The request presenter 24 is a block which presents the operator P1 the necessity of manually operating the self-propelled robot 1, which is notified from the request detector 111. According to the manual operation request inputted from the operation controller 27, the request presenter 24 presents the operator P1 the manual operation request. Here, when the manual operation request is inputted, it makes the vibrator vibrate.

The manipulation-side microphone 25 acquires voice of the operator P1, and outputs it to the operation controller 27 as an operator voice signal.

The manipulation-side sound emitter 26 emits voice according to a conversation partner voice signal inputted from the operation controller 27.

The operation controller 27 generates a manual operation signal according to the key operation signal inputted from the manual operation part 21, and outputs it to the manipulation-side communicator 28. This manual operation signal is generated, for example, based on information on an assignment of "operation of a self-propelled robot" to "a combination of key operation signals of the operation keys 29" set beforehand. Further, the operation controller 27 outputs to the manipulation-side communicator 28 the automatic operation signal inputted from the automatic operation part 22 and the operator voice signal inputted from the manipulation-side microphone 25. Further, the operation controller 27 suitably generates the image display signal based on circumference image signal, hand image signal, and main image signal which are inputted from the manipulation-side communicator 28, and outputs it to the manipulation-side display 23.

The operation controller 27 also outputs the manual operation request inputted from the manipulation-side communicator 28 to the request presenter 24, and outputs the conversation partner voice signal inputted from the manipulation-side communicator 28 to the manipulation-side sound emitter 26.

The manipulation-side communicator 28 is comprised of a communication apparatus capable of data communications. The manipulation-side communicator 28 converts into communication data (packet) each of the manual operation signal, the automatic operation signal, and the operator voice signal which are inputted from the operation controller 27, and transmits it to the robot-side communicator 113.

Further, the manipulation-side communicator 28 receives communication data of the circumference image signal, the hand image signal, the main image signal, the manual operation request, and the conversation partner voice signal from the robot-side communicator 113, converts them back to the circumference image signal, the hand image signal, the main image signal, the manual operation request, and the conversation partner voice signal, and outputs them to the operation controller 27.

Here, these communications are performed via the data communication network 3.

Here, the operation controller 27 and the automatic operation part 22 are comprised of the arithmetic circuit module Cm2 having the processor Pr2 and the memory Me2. The operation controller 27 and the automatic operation part 22 are functional blocks realized in this arithmetic circuit module Cm2 by the processor Pr2 executing a control program stored in the memory Me2. In detail, the arithmetic circuit module Cm2 is comprised of a microcontroller, an MPU, an FPGA (Field Programmable Gate Array), a PLC (Programmable Logic Controller), etc., for example. These may be comprised of a sole arithmetic circuit module which performs a centralized control, or may be comprised of a plurality of arithmetic circuit modules which perform a distributed control.

{Configuration on Self-Propelled Robot 1 Side}

The self-propelled robot 1 includes the traveler 11, the hoist 12, the arm 13, the robot-side display 14, the robot-side microphone 15, the robot-side sound emitter 16, the circumference cameras 17, the hand camera 18, the main camera 19, the request detector 111, the robot controller 112, and the robot-side communicator 113.

The robot-side communicator 113 is comprised of a communication apparatus capable of data communications. The robot-side communicator 113 receives the communication data of the manual operation signal, the automatic operation signal, and the operator voice signal from the manipulation-side communicator 28, converts them back to the manual operation signal, the automatic operation signal, and the operator voice signal, and outputs them to the robot controller 112.

Further, the robot-side communicator 113 converts into communication data the circumference image signal, the hand image signal, the main image signal, the manual operation request, and the conversation partner voice signal which are inputted from the robot controller 112, and transmits them to the manipulation-side communicator 28.

The robot controller 112 outputs the manual operation signal and the automatic operation signal which are inputted from the robot-side communicator 113 to the traveler 11, the hoist 12, and the arm 13, and outputs the operator voice signal inputted from the robot-side communicator 113 to the robot-side sound emitter 16.

Further, the robot controller 112 suitably generates the image display signal, and outputs it to the robot-side display 14.

Further, the robot controller 112 outputs the operator voice signal inputted from the robot-side communicator 113 to the robot-side sound emitter 16. In this case, for example, the robot controller 112 may display on the robot-side display 14 an image of one wearing a given convenience store employee's uniform (for example, an illustration image), and may convert the operator voice signal into a signal of voice which matches with the given convenience store employee (for example, voice which corresponds to the sex of the employee, and is soft).

Further, the robot controller 112 outputs to the robot-side communicator 113 the circumference image signal inputted from the circumference cameras 17, the hand image signal inputted from the hand camera 18, the main image signal inputted from the main camera 19, and the manual operation request inputted from the request detector 111.

The traveler 11, the hoist 12, and the arm 13 operate according to the manual operation signal and the automatic operation signal which are inputted from the robot controller 112.

The robot-side display 14 displays an image according to the image display signal inputted from the robot controller 112.

The robot-side microphone 15 acquires the voice of the conversation partner (for example, a customer), and outputs it to the robot controller 112 as the conversation partner voice signal.

The robot-side sound emitter 16 emits the voice according to the operator voice signal inputted from the robot controller 112. The robot-side sound emitter 16 is comprised of a speaker, for example.

The circumference cameras 17 image the environment around the self-propelled robot 1, and output it to the robot controller 112 as the circumference image signal.

The hand camera 18 images the environment (scenery) of the hand of the second robotic arm 121B, and outputs it to the robot controller 112 as the hand image signal. One example of the environment of the hand of the second robotic arm 121B is an object which the hand 124B is about to grip.

The main camera 19 images the field of view equivalent to a field of view of a standing person, and outputs it to the robot controller 112 and the request detector 111 as the main image signal. When the self-propelled robot 1 faces the conversation partner, an image of the conversation partner exists in the main image.

The request detector 111 informs (that is, outputs) a result that the necessity of operating the self-propelled robot 1 manually was detected. The request detector 111 generates the manual operation request based on the main image inputted from the main camera 19, and outputs it to the robot controller 112. For example, the request detector 111 acquires the main image, performs processing for extracting the conversation partner image from the main image by image processing, and when the conversation partner image exists in the main image, it generates the manual operation request. Note that high accuracy is not required for the extraction of the contour of a person from the captured image in this embodiment. Therefore, various kinds of known methods are applicable to such image processing. Therefore, the detailed explanation is omitted and simple image processing will be illustrated. For example, by binarizing the captured image and performing edge processing, a contour candidate of a person is extracted from the captured image, and by determining the matching of this person's contour candidate with a contour of a reference person, it can be determined whether the person exists in the captured image. Alternatively, it may be determined whether the person exists in the captured image by using AI (artificial intelligence).

Here, the robot controller 112 and the request detector 111 are comprised of the arithmetic circuit module Cm1 having the processor Pr1 and the memory Me1. The robot controller 112 and the request detector 111 are functional blocks realized in this arithmetic circuit module Cm1 by the processor Pr1 executing a control program stored in the memory Me1. In detail, this arithmetic circuit module Cm1 is comprised of a microcontroller, an MPU, an FPGA (Field Programmable Gate Array), a PLC (Programmable Logic Controller), etc., for example. These may be comprised of a sole arithmetic circuit module which performs a centralized control, or may be comprised of a plurality of arithmetic circuit modules which perform a distributed control.

The functions of the elements disclosed herein may be performed using circuitry or processing circuitry including a general-purpose processor, a dedicated processor, an integrated circuit, ASIC (Application Specific Integrated Circuits), conventional circuitry, and/or a combination thereof, which are configured or programmed to execute the disclosed functions. Since the processor includes transistors or other circuitry, it is considered to be processing circuitry or circuitry. In the present disclosure, "unit" or "part" is hardware which performs the listed function, or hardware programmed to perform the listed function. The hardware may be hardware disclosed herein, or may be other known hardware programmed or configured to perform the listed function. When the hardware is a processor considered to be a kind of circuitry, the "unit" or the "part" is a combination of hardware and software, and the software is used for the configuration of the hardware and/or the processor.

<Configuration of a Plurality of Self-Propelled Robots>

Identification symbols are given to the self-propelled robots 1A and 1B.

Meanwhile, the automatic operation part 22 stores the automatic operation program for each of the plurality of (here, two) self-propelled robots 1A and 1B to operate the self-propelled robot automatically.

Further, for example, by operating a combination of operation keys 29, the manual operation part 21 of the manipulator 2 is capable of outputting a key operation signal for selecting the self-propelled robot to be manually operated (hereinafter, referred to as the "manual operation selection signal"), and outputting a key operation signal for selecting either automatic operation or stop of the operation of the self-propelled robot not to be manually operated (hereinafter, referred to as the "automatic operation/stop selection signal"). These selection signals are outputted to the operation controller 27.

When the manual operation selection signal is received, the operation controller 27 gives the identification symbol of the self-propelled robot to be manually operated, as a destination, to the manual operation signal which is generated subsequently, and outputs it to the manipulation-side communicator 28.

Further, when the automatic operation/stop selection signal is received, the operation controller 27 operates as follows. If the automatic operation/stop selection signal is a signal for selecting the "automatic operation," it notifies the self-propelled robot not to be manually operated to the automatic operation part 22. Then, the automatic operation part 22 starts the automatic operation program corresponding to the self-propelled robot not to be manually operated, and outputs the automatic operation signal. This automatic operation signal includes the identification symbol of the self-propelled robot not to be manually operated, as a destination, and the operation controller 27 outputs it to the manipulation-side communicator 28.

On the other hand, if the automatic operation/stop selection signal is a signal for selecting the "stop," the operation controller 27 outputs to the manipulation-side communicator 28 the stop signal which includes, as a destination, the identification symbol of the self-propelled robot not to be manually operated.

The robot controller 112 of each of the self-propelled robot 1A and 1B processes only a signal (data) which includes, as a destination, the identification symbol of the self-propelled robots 1A or 1B to which it belongs, among various kinds of signals (data) inputted from the robot-side communicator 113.

By the configuration described above, the plurality of self-propelled robots 1A and 1B can be operated while switching between the manual operation and the automatic operation by using the single manipulator 2.

[Operation (Robot Working Method)]

Figure 5A:
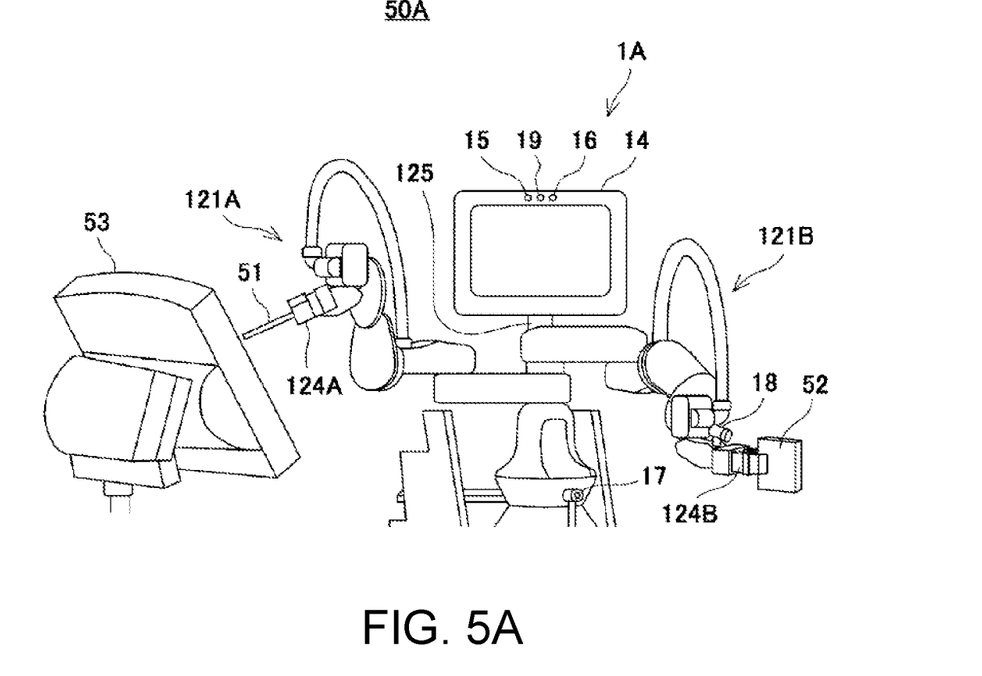
FIG. 5A is a view illustrating operation of the robot system of FIG. 1, and is a schematic view illustrating a situation in which a first self-propelled robot operates a cash register in a convenience store.
Figure 5B:
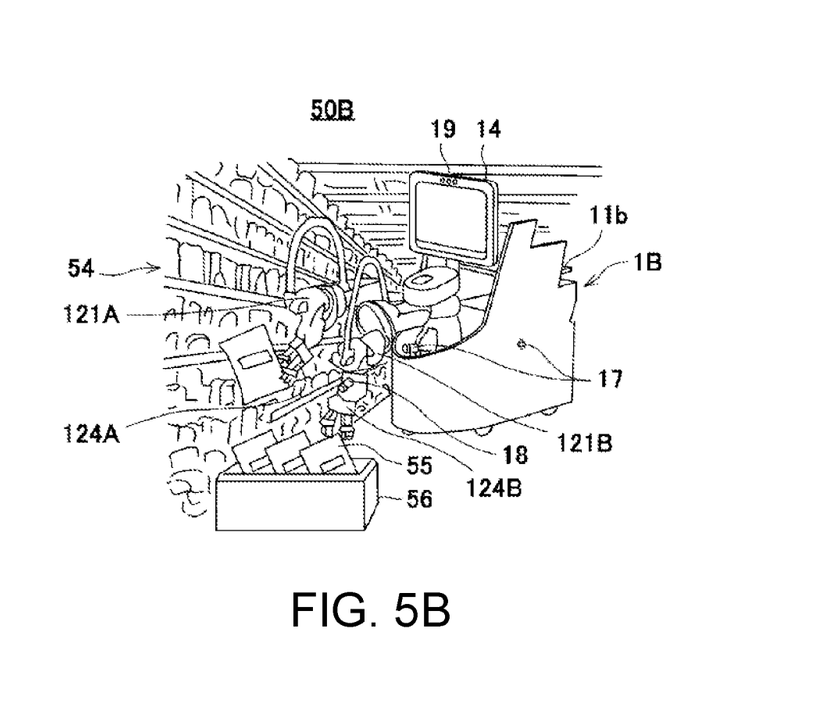
FIG. 5B is a view illustrating operation of the robot system of FIG. 1, and is a schematic view illustrating a situation in which a second self-propelled robot performs a product display work in the convenience store.

Next, operation of the robot system 100 (robot working method) thus configured is described. FIG. 5A is a view illustrating the operation of the robot system 100 of FIG. 1, and is a schematic view illustrating a situation in which the first self-propelled robot 1A operates a cash register in a convenience store. FIG. 5B is a view illustrating the operation of the robot system 100 of FIG. 1, and is a schematic view illustrating a situation in which the second self-propelled robot 1B performs a product display work in the convenience store.

Referring to FIG. 3, the manipulator 2 is connected with the first and second self-propelled robots 1A and 1B via the data communication network 3 (here, the Internet). The manipulator 2 is connected with the data communication network 3 wirelessly. Further, the first and second self-propelled robots 1A and 1B are also connected with the data communication network 3 wirelessly.

Referring to FIGS. 1, 4, and 5A and 5B, the first self-propelled robot 1A operates a cash register (casher location) 50A (transaction work) in a certain convenience store, and the second self-propelled robot 1B performs a product display work in a product display area 50B of the convenience store. The first self-propelled robot 1A and the second self-propelled robot 1B are both configured similarly to the self-propelled robot 1 of FIG. 1, and they are capable of operating the cash register and performing the product display work, as will be described below. Further, the automatic operation part 22 of the manipulator 2 stores the automatic operation programs of the first and second self-propelled robots 1A and 1B. The automatic operation programs are programmed so that, for example, the first and second self-propelled robots 1A and 1B pick out products 55 from a product container 56 placed on the floor in front of a product display rack 54 under a product display work, arrange or display the products 55 on the product display rack 54 in order, and stop the operation when they finish arranging or displaying the products 55.

The first and second self-propelled robots 1A and 1B are configured to take a shrink posture (not illustrated) in which the first and second robotic arms 121A and 121B are folded when they are stopped. Further, the first and second self-propelled robots 1A and 1B are configured so that, during the stop, the robot-side display 14, the robot-side microphone 15, the robot-side sound emitter 16, the circumference cameras 17, the hand camera 18, the main camera 19, and the request detector 111 are active. For example, the illustration image indicative of a person wearing a given convenience store employee's uniform as described above is displayed on the robot-side display 14.

For example, the operator P1 is present in the house away from the convenience store, connects the connecting cord 30 of the wearable speaker 26a to the voice output terminal of the manipulator 2, puts the wearable speaker 26a on the head, and operates the manipulator 2 with both hands.

The operator P1 manipulates the first and second self-propelled robots 1A and 1B as follows, for example.

First, he/she selects the second self-propelled robot 1B as a self-propelled robot to be manually operated, and stops the first self-propelled robot 1A.

Then, he/she operates the manipulator 2 to manipulate the second self-propelled robot 1B as follows.

The second self-propelled robot 1B puts a plurality of the product containers 56 on the shelf 11b, and moves within the product display area 50B. In the process, it puts the product container 56 on the floor in front of the product display rack 54 from the shelf 11b, picks out the products 55 from the product container 56, and arranges the products 55 on the product display rack 54 in order.

Here, the second self-propelled robot 1B grips the product 55 alternately by the pair of hands 124A and 124B.

Further, the operator P1 moves the second self-propelled robot 1B, while monitoring the circumference of the second self-propelled robot 1B by using the circumference image from the circumference cameras 17. Then, the operator P1 checks the product display rack 54 in which the products 55 are displayed, in the main image from the main camera 19. Then, the operator P1 puts down the product container 56 from the shelf 11b on the floor, while checking a gripping position of the product container 56 by using the hand image from the hand camera 18, and makes the robot grip the product 55, while checking the gripping position of the product 55 by using the hand image from the hand camera 18.

Then, during this product display work, when a customer (not illustrated) comes to the register 50A, the main camera 19 of the first self-propelled robot 1A images this customer, and the request detector 111 extracts the customer's image from the main image, and outputs the manual operation request based on the customer's image. Then, the vibrator of the request presenter 24 of the manipulator 2 vibrates.

Thus, the operator P1 notices that a customer came to the register 50A, selects the first self-propelled robot 1A as a self-propelled robot to be manually operated, and makes the second self-propelled robot 1B operate automatically.

Then, he/she says to the manipulation-side microphone 25 that "Hello, please wait a minute." Then, the words are converted into a given soft voice, and emitted from the robot-side sound emitter 16 of the first self-propelled robot 1A.

Then, the operator P1 operates the manipulator 2 so that the first self-propelled robot 1A operates as follows.

For example, the first self-propelled robot 1A uses the hand 124B of the second robotic arm 121B to grip the product 52 in a shopping basket (not illustrated) placed at a purchasing products place (not illustrated) of the register and take out the product 52 from the shopping basket, and holds the product 52 up to a barcode reader (not illustrated) and inputs the price of the product 52 into a casher machine 53. Then, it grips a pointing rod 51 by using the hand 124A of the first robotic arm 121A, and performs a necessary input into the casher machine 53.

Here, the first self-propelled robot 1A has a conversation suitably with the customer, as needed. This conversation is performed using the manipulation-side display 23, the manipulation-side microphone 25, and the manipulation-side sound emitter 26 of the manipulator 2, as well as the robot-side microphone 15, the robot-side sound emitter 16, and the main camera 19 of the first self-propelled robot 1A.

In detail, the customer is captured by the main camera 19 and the captured main image is displayed on the manipulation-side display 23 of the manipulator 2, and the customer's voice is acquired by the robot-side microphone 15 and the voice is emitted from the manipulation-side sound emitter 26 of the manipulator 2. On the other hand, the voice of the operator P1 is acquired by the manipulation-side microphone 25 and the voice is emitted from the robot-side sound emitter 16 of the self-propelled robot 1A. Thus, the first self-propelled robot 1A has a conversation with the customer.

Further, the operator P1 makes the hand 124B grip the product 52, while checking the gripping position of the product 52 by using the hand image of the hand camera 18.

In the meantime, the second self-propelled robot 1B picks out the products 55 from the product container 56 placed on the floor in front of the product display rack 54 under the product display work, and arranges the products 55 on the display rack 54 in order, and when it finishes displaying the products 55, it stops the display work, according to the automatic operation program of the automatic operation part 22 of the manipulator 2.

When the first self-propelled robot 1A finishes the operation of the cash register for the customer, the operator P1 selects the second self-propelled robot 1B as a self-propelled robot to be manually operated, and stops the first self-propelled robot 1A.

For example, when there is a defect in the product display which is performed automatically by the second self-propelled robot 1B, the operator P1 manually operates the second self-propelled robot 1B to correct the defect.

Note that the operator P1 may make the second self-propelled robot 1B operate (transaction work) the cash register (casher location) 50A, and make the first self-propelled robot 1A perform the product display work in the product display area 50B.

As described above, according to Embodiment 1, since the two self-propelled robots 1A and 1B are operated by the single manipulator 2, the robotization can be achieved efficiently. Further, since the self-propelled robots 1A and 1B are used as the robots, the product display work which is performed by a person while the person moving can also be robotized, and since the two self-propelled robots 1A and 1B are capable of performing the operation of the cash register and the product display work which are mutually different kinds of work, the self-propelled robots 1A and 1B used are applicable to two kinds of work. As a result, it is possible to contribute to the progress in the robotization of the human works in all industries.

Embodiment 2

Embodiment 2 is different from Embodiment 1 in the features which will be described below, and is the same as Embodiment 1 in other features. Below, the differences are described.

Figure 6A:
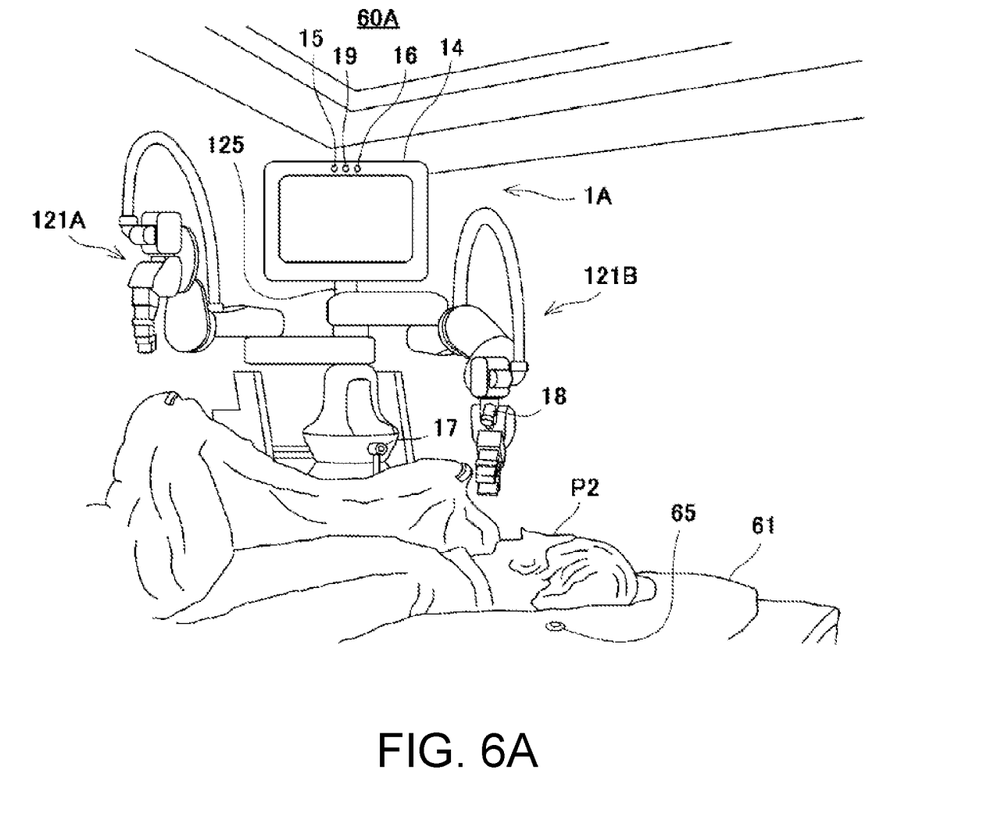
FIG. 6A is a view illustrating operation of a robot system according to Embodiment 2 of the present disclosure, and is a schematic view illustrating a situation in which the first self-propelled robot performs a nursing work in a nursing home.
Figure 6B:
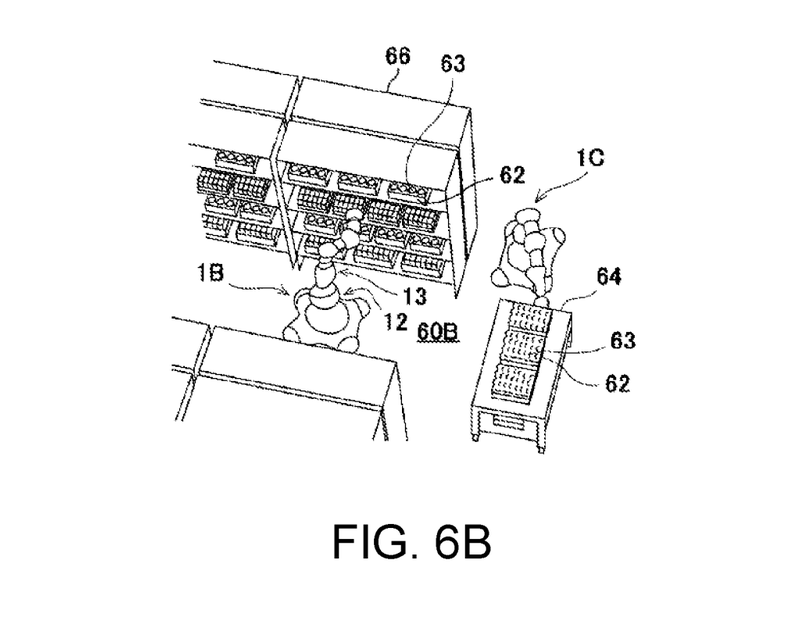
FIG. 6B is a view illustrating operation of the robot system according to Embodiment 2 of the present disclosure, and is a schematic view illustrating a situation in which the second self-propelled robot and a third self-propelled robot perform picking of products in a warehouse of a supermarket.

FIG. 6A is a view illustrating operation of a robot system according to Embodiment 2 of the present disclosure, and is a schematic view illustrating a situation in which the first self-propelled robot 1A performs a nursing work in a nursing home 60A. FIG. 6B is a view illustrating operation of the robot system according to Embodiment 2 of the present disclosure, and is a schematic view illustrating a situation in which second and third self-propelled robots 1B and 1C pick products 63 in a warehouse 60B of a supermarket.

Referring to FIG. 3, the manipulator 2 is connected with the first to third self-propelled robots 1A-1C via the data communication network 3 (here, the Internet). The manipulator 2 is connected with the data communication network 3 wirelessly. Further, the first to third self-propelled robots 1A-1C are also connected with the data communication network 3 wirelessly.

The automatic operation part 22 of the manipulator 2 does not store the automatic operation program of any of the first to third self-propelled robots 1A-1C.

Referring to FIGS. 6A and 6B, the first self-propelled robot 1A is configured similarly to the self-propelled robots 1A and 1B of Embodiment 1. The first self-propelled robot 1A performs the nursing work in the nursing home 60A. In this nursing home 60A, a care recipient P2 lies on a bed 61. A nurse call button 65 is placed above the bed 61. The nurse call button 65 is wirelessly connected with the request detector 111 (see FIG. 4) of the first self-propelled robot 1A. The request detector 111 outputs the manual operation request, when the nurse call button 65 is pushed.

The second and third self-propelled robots 1B and 1C are each provided on the low traveler 11 via the hoist 12 with an arm 13 which is comprised of a single-armed vertical articulated robotic arm. The second and third self-propelled robots 1B and 1C pick the products 63 in the warehouse 60B of a hypermarket. Since this picking work is a kind of work not dealing with any human (non-interpersonal work), the second and third self-propelled robots 1B and 1C are not provided with the elements required for the conversation of the self-propelled robot 1 of FIG. 1 (the robot-side display 14, the robot-side microphone 15, the robot-side sound emitter 16, and the main camera 19). Of course, the second and third self-propelled robots 1B and 1C may be provided with the elements required for the conversation. Surveillance cameras, which are capable of monitoring the picking work by the second and third self-propelled robots 1B and 1C, are provided at suitable locations of the warehouse and images captured by the surveillance cameras are displayed on the manipulation-side display 23 of the manipulator 2.

In this embodiment, the operator P1 manipulates the first to third self-propelled robots 1A-1C as follows.

The operator P1 selects the first self-propelled robot 1A as a self-propelled robot to be manually operated, and stops the second and third self-propelled robots 1B and 1C.

Then, the operator P1 manipulates the first self-propelled robot 1A as follows, for example.

In the nursing home 60A, the first self-propelled robot 1A travels by itself, approaches the care recipient P2 who lies on the bed 61, and images the appearance of the care recipient P2 by the hand camera 18 of the second robotic arm 121B. The operator P1 checks the appearance of the care recipient P2 by using the hand image displayed on the manipulation-side display 23, and has a required conversation, such as an oral consultation, with the care recipient P2. This conversation is performed similarly to Embodiment 1.

In the nursing home 60A, since there is no necessity of always performing the nursing work, the operator P1 may make the robot perform the picking work in the warehouse 60B of the hypermarket during spare time. Since this picking work is seldom restrained by time, it can also be achieved along the nursing work.

When the nursing work is finished, the operator P1 selects the second self-propelled robot 1B as a self-propelled robot to be manually operated, and stops the first self-propelled robot 1A.

Then, the operator P1 manipulates the second self-propelled robot 1B as follows, while looking at the captured image(s) of the surveillance camera(s) displayed on the manipulation-side display 23 of the manipulator 2.

The second self-propelled robot 1B picks out the necessary product 63 from the product containers 62 which are arranged on a product shelf 66, and puts it into the product container 62 which is placed on a movable shelf 64, while moving in the warehouse 60B.

Then, when it becomes necessary to pick a product on the product shelf 66 near the third self-propelled robot 1C, the operator P1 selects the third self-propelled robot 1C as a self-propelled robot to be manually operated, and stops the second self-propelled robot 1B. Then, he/she operates the third self-propelled robot 1C similarly to the second self-propelled robot 1B, and makes the third self-propelled robot 1C perform the picking work.

Here, when the care recipient P2 in the nursing home 60A pushes the nurse call button 65, the vibrator of the request presenter 24 of the manipulator 2 vibrates. Then, the operator P1 selects the first self-propelled robot 1A as a self-propelled robot to be manually operated, and stops the third self-propelled robot 1C.

Then, the operator P1 operates the manipulator 2 manually to make the first self-propelled robot 1A perform the required nursing work.

Also by such Embodiment 2, effects similar to Embodiment 1 can be achieved.

Embodiment 3

In Embodiment 3, the robot system of Embodiment 1 or Embodiment 2 is altered as follows. In the robot system of Embodiment 3, when the operation controller 27 of the manipulator 2 receives the manual operation request, it selects the self-propelled robot which outputted the manual operation request as a self-propelled robot to be manually operated. Then, it automatically operates the self-propelled robot which has been manually operated, or stops it. In detail, when the automatic operation part 22 stores the automatic operation program of the self-propelled robot which has been manually operated, the operation controller 27 operates the self-propelled robot automatically, and otherwise, it stops the self-propelled robot.

Other features are the same as those of the robot system of Embodiment 1 or Embodiment 2.

According to Embodiment 3, it automatically enables the operator P1 of the manipulator 2 to operate manually the self-propelled robot which needs to be manually operated.

Embodiment 4

According to Embodiment 4, in the robot system of any one of Embodiments 1-3, the automatic operation part 22 of the manipulator 2 is omitted. Other features are the same as those of the robot systems of Embodiments 1-3.

According to Embodiment 4, the manipulator 2 is simplified.

Embodiment 5

According to a robot system of Embodiment 5, in the robot system of any one of Embodiments 1-3, the automatic operation part 22 of the manipulator 2 is omitted, and the automatic operation program is stored in the robot controller 112 of each self-propelled robot. When the automatic operation/stop selection signal which is a signal for selecting the "automatic operation" is received, the operation controller 27 outputs an automatic operation command to the self-propelled robot not to be manually operated. The robot controller 112 of the self-propelled robot which received the automatic operation command operates the traveler 11, the hoist 12, and the arm 13 according to the automatic operation program.

Other features are the same as those of the robot systems of Embodiments 1-3.

According to Embodiment 5, the manipulator 2 is simplified.

Other Embodiments

In any one of Embodiments 1-5, the power source of the self-propelled robot 1 may be an internal combustion engine. In this case, the self-propelled robot 1 includes a generator driven by the internal combustion engine, and a rechargeable battery charged by the generator, and an electric device of the self-propelled robot 1 operates using the rechargeable battery as the power supply.

As described above, in the above embodiments of the present disclosure, the robot system 100 further includes a detector 111 which detects the necessity of operating each of the plurality of self-propelled robots 1A-1C manually, and outputs the manual operation request (informing a result that the necessity of the manual operation was detected) for requesting the manual operation of the manual-operation-required self-propelled robot for which the necessity of the manual operation was detected.

In the human works, there is a work which is difficult to accomplish if the robot is not manually operated. According to this configuration, since the detector 111 detects a self-propelled robot (1A-1C) which needs to be manually operated among the self-propelled robots 1A-1C and outputs the manual operation request, the work which is difficult to be accomplished if the robot is not manually operated can be conducted appropriately.

Further, the robot system 100 further includes a presenter 24 which presents the manual operation request outputted from the detector 111 (presenting the necessity of the manual operation informed by the detector 111) to the operator P1 who performs the manual operation using the manipulator 2.

Therefore, it becomes possible for the operator P1 of the manipulator 2 to manually operate the self-propelled robot (1A-1C) which needs to be manually operated, by utilizing the presentation of the presenter 24.

Further, when the manual operation request is received, the manipulator 2 makes the manual-operation-required self-propelled robot (1A-1C) corresponding to the manual operation request be manually operable.

Therefore, it automatically enables the operator P1 of the manipulator 2 to manually operate the self-propelled robot (1A-1C) which needs to be manually operated.

Further, when the manual operation of the manual-operation-required self-propelled robot (1A-1C) is enabled, the manipulator 2 makes the self-propelled robot (1A-1C) which has been manually operable operate automatically.

Therefore, since the self-propelled robots 1A-1C not to be manually operated can operate automatically, the plurality of self-propelled robots 1A-1C can be used efficiently.

Further, when the manual operation of the manual-operation-required self-propelled robot (1A-1C) is enabled, the manipulator 2 stops the self-propelled robot (1A-1C) which has been manually operable.

Therefore, the self-propelled robot (1A-1C) which has been manually operable can be made into a safe state (a state where it cannot perform any unexpected work), and the manual-operation-required self-propelled robot (1A-1C) can be manually operated.

Further, the self-propelled robot (1A-1C) to be stopped takes the given shrink posture in which the robotic arms 121A and 121B are folded.

Therefore, the possibility of the self-propelled robot (1A-1C) to be stopped becoming obstructive in the work site can be reduced.

Further, the manipulator 2 includes the manual operation part 21 for operating the self-propelled robots 1A-1C manually.

Therefore, by the operator P1 operating the manual operation part 21, the self-propelled robots 1A-1C can be operated manually.

Further, the manipulator 2 includes the automatic operation part 22 for operating the self-propelled robots 1A-1C automatically.

Therefore, the plurality of self-propelled robots 1A-1C can be automatically operated by the automatic operation part 22.

Further, the manipulator 2 includes the manual operation part 21 to operate the self-propelled robots 1A-1C, the automatic operation part 22 to operate the self-propelled robots 1A-1C automatically, and the switch (the operation controller 27 which functions as switching circuitry) configured to selectively switch the operation of the manipulator 2 between the manual operation in which the self-propelled robots 1A-1C are manually operated by the manual operation part 21, the automatic operation in which the self-propelled robots 1A-1C are automatically operated by the automatic operation part 22, and the stop.

Therefore, the plurality of self-propelled robots 1A-1C can be operated, while switching between the manual operation and the automatic operation.

Further, the two robotic arms 121A and 121B are provided to the carriage 11.

Therefore, since the self-propelled robots 1A-1C can use the two robotic arms 121A and 121B, they can carry out a more variety of works.

Further, the robotic arms 121A and 121B are provided to the carriage 11 so as to be raised and lowered.

Therefore, since the self-propelled robots 1A-1C can raise and lower the robotic arms 121A and 121B, they can carry out a more variety of works.

Further, the mutual difference in the kinds of given works performed by the plurality of self-propelled robots 1A-1C is the difference between the interpersonal work and the non-interpersonal work.

Conventionally, the non-interpersonal works are mainly robotized. Since the interpersonal works are also robotized by above-mentioned configuration, the robots used are applicable to a wide variety of works accordingly.

Further, at least one of the given works performed by the respective plurality of self-propelled robots 1A-1C is a work in tertiary industry.

Conventionally, the works in secondary industry are mainly robotized. Since the works in tertiary industry which is higher in the GDP contribution compared with secondary industry are robotized by above-mentioned configuration, it contributes to the progress in the robotization of the human works in all industries accordingly.

Further, the plurality of self-propelled robots 1A-1C are connected with the manipulator 2 via the network 3 in which data communications are possible.

Therefore, this robot system 100 can be implemented in a remote work environment.

SUMMARY

A robot system 100 according to the present disclosure includes a plurality of self-propelled robots 1, each including an autonomously travelable carriage 11 and a robotic arm (121A, 121B) mounted on the carriage 11, and a single manipulation console 2 that is operated by an operator to allow the operator to manually operate the plurality of self-propelled robots 1. The plurality of self-propelled robots 1 include a first self-propelled robot 1A that performs a given first work, and a second self-propelled robot 1B that performs a given second work different in kind from the first work.

Further, a robot working method according to the present disclosure is a robot working method using a plurality of self-propelled robots 1, each including an autonomously travelable carriage 11 and a robotic arm (121A, 121B) mounted on the carriage 11, and includes making a first self-propelled robot 1A among the plurality of self-propelled robots 1 perform a given first work, and making a second self-propelled robot 1B among the plurality of self-propelled robots 1 perform a given second work different in kind from the first work, and by an operator operating a single manipulation console 2, manually operating the first self-propelled robot 1A or the second self-propelled robot 1B selectively.

According to the robot system 100 and the robot working method of the above-described configuration, since the plurality of self-propelled robots 1 are operated by using the single manipulation console 2, the robotization can be achieved efficiently. Further, since the self-propelled robots 1 are used as the robots, the work which is performed by a person while the person moving can also be robotized, and since the plurality of self-propelled robots 1 are capable of performing mutually different kinds of work, the robots used are applicable a wide variety of works. As a result, it is possible to contribute to the progress in the robotization of the human work in all industries.

In the above-described robot system 100, the manipulation console 2 may automatically operate the plurality of self-propelled robots 1. The first self-propelled robot 1A may perform the first work in automatic operation, and the second self-propelled robot 1B may perform the second work in automatic operation.

The above-described robot system 100 may further include detecting circuitry 111 that detects necessity of manually operating each of the plurality of self-propelled robots 1, and informs a result of detecting the necessity of manual operation, and an informer 24 that presents the operator the necessity of manual operation informed by the detecting circuitry 111.

The above-described robot system 100 may further include a camera 19 mounted on the self-propelled robot 1. The detecting circuitry 111 may include a processor Pr1 and a memory Me1, and by the processor Pr1 executing a given program stored in the memory Me1, the detecting circuitry may carry out image processing of an image captured by the camera 19, and detect the necessity of the manual operation, when a person exists in the image.

In the above-described robot system 100, the manipulation console 2 may include switching circuitry 27 that selectively switches between operating the self-propelled robot 1 automatically, enabling the manual operation of the self-propelled robot 1, and stopping the self-propelled robot 1. When the manual operation of the first self-propelled robot 1A is enabled, the manipulation console 2 may make the second self-propelled robot 1B that has been manually operable operate automatically. Alternatively, in the above-described robot system 100, the manipulation console 2 may include switching circuitry 27 that selectively switches between operating the self-propelled robot 1 automatically, enabling the manual operation of the self-propelled robot 1, and stopping the self-propelled robot 1. When the manual operation of the first self-propelled robot 1A is enabled, the manipulation console 2 may make the second self-propelled robot 1B that has been manually operable stop. According to the robot system 100 of the above-described configuration, when any one of the self-propelled robots 1 is switched to the manual operation, the other self-propelled robots 1 can be automatically switched to the automatic operation or the stop. Thus, the operation of the self-propelled robots 1 can be switched efficiently.

In the above-described robot system 100, the plurality of self-propelled robots 1 may be connected with the manipulation console 2 via a network 3 in which data communications are possible. Thus, the operator can remotely operate the plurality of self-propelled robots 1 from a location distant therefrom.

In the above-described robot system 100, the manipulation console 2 may include automatic operation circuitry 22 that outputs an automatic operation signal according to a given automatic operation program, and an operation controller 112 that outputs the automatic operation signal outputted from the automatic operation circuitry 22 to the self-propelled robot 1 to be operated automatically among the plurality of self-propelled robots 1. Each of the plurality of self-propelled robots 1 may include a robot controller 27 that operates the carriage 11 and the robotic arm (121A, 121B) based on the received automatic operation signal. Since the automatic operation circuitry 22 is mounted on the manipulation console 2 as described above, the plurality of self-propelled robots 1 can be general-purpose robots.

It is apparent for the person skilled in the art that many improvements and other embodiments are possible from the above description. Therefore, the above description is to be interpreted only as illustration.

The functionality of the elements disclosed herein may be implemented using circuitry or processing circuitry which includes general-purpose processors, special-purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or other known hardware which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A robot system, comprising:
   a plurality of self-propelled robots, each including an autonomously travelable carriage and a robotic arm mounted on the carriage; and
   a single manipulation console that is operated by an operator to allow the operator to manually operate the plurality of self-propelled robots,
   wherein the plurality of self-propelled robots include a first self-propelled robot that performs a given first work, and a second self-propelled robot that performs a given second work different in kind from the first work,
   wherein the manipulation console includes switching circuitry that selectively switches between operating the self-propelled robot automatically, enabling the manual operation of the self-propelled robot, and stopping the self-propelled robot,
   wherein the manipulation console includes automatic operation/stop circuitry that outputs an automatic operation/stop signal according to a given operation program, and an operation controller that selectively outputs the automatic operation/stop signal outputted from the automatic operation circuitry to the self-propelled robot to be operated automatically or stopped among the plurality of self-propelled robots, and
   wherein, when the manual operation of the first self-propelled robot is enabled, the manipulation console, based on the selection by the automatic operation/stop signal, makes the second self-propelled robot that has been manually operable either operate automatically or stop.

2. The robot system of claim 1, wherein the manipulation console automatically operates the plurality of self-propelled robots,
   wherein the first self-propelled robot performs the first work in automatic operation, and the second self-propelled robot performs the second work in automatic operation.

3. The robot system of claim 1, further comprising detecting circuitry that detects necessity of manually operating each of the plurality of self-propelled robots, and informs a result of detecting the necessity of manual operation, and an informer that presents the operator the necessity of manual operation informed by the detecting circuitry.

4. The robot system of claim 3, further comprising a camera mounted on the self-propelled robot,
   wherein the detecting circuitry includes a processor and a memory, and by the processor executing a given program stored in the memory, the detecting circuitry carries out image processing of an image captured by the camera, and detects the necessity of the manual operation, when a person exists in the image.

5. The robot system of claim 1, wherein the plurality of self-propelled robots are connected with the manipulation console via a network in which data communications are possible.

6. The robot system of claim 2,
   wherein each of the plurality of self-propelled robots includes a robot controller that operates the carriage and the robotic arm based on the received automatic operation/stop signal.

7. A robot working method using a plurality of self-propelled robots, each including an autonomously travelable carriage and a robotic arm mounted on the carriage, the method comprising:
   making a first self-propelled robot among the plurality of self-propelled robots perform a given first work, and making a second self-propelled robot among the plurality of self-propelled robots perform a given second work different in kind from the first work; and
   by an operator operating a single manipulation console, manually operating the first self-propelled robot or the second self-propelled robot selectively,
   wherein the manipulation console includes switching circuitry that selectively switches between operating the self-propelled robot automatically, enabling the manual operation of the self-propelled robot, and stopping the self-propelled robot,
   wherein the manipulation console includes automatic operation/stop circuitry that outputs an automatic operation/stop signal according to a given operation program, and an operation controller that selectively outputs the automatic operation/stop signal outputted from the automatic operation circuitry to the self-propelled robot to be operated automatically or stopped among the plurality of self-propelled robots, and
   wherein, when the manual operation of the first self-propelled robot is enabled, the manipulation console, based on the selection by the automatic operation/stop signal, makes the second self-propelled robot that has been manually operable either operate automatically or stop.

\* \* \* \* \*